(12) United States Patent
Huang et al.

(10) Patent No.: US 7,349,001 B2
(45) Date of Patent: Mar. 25, 2008

(54) ELECTRONIC DEVICE

(75) Inventors: Wen-Shang Huang, Taipei (TW);
Hsin-Chin Liu, Taipei (TW); Chi-Wei Lin, Taipei (TW)

(73) Assignee: Inventec Appliance Corporation, Taipei Hsieng (TW)

( * ) Notice: Subject to any disclaimer, the term of this patent is extended or adjusted under 35 U.S.C. 154(b) by 586 days.

(21) Appl. No.: 10/964,699

(22) Filed: Oct. 15, 2004

(65) Prior Publication Data

US 2005/0225528 A1 Oct. 13, 2005

(51) Int. Cl.
*G06F 3/33* (2006.01)

(52) U.S. Cl. .................. 345/905; 345/179; 345/169

(58) Field of Classification Search ........ 345/156–184, 345/905; 178/18.01–18.11, 19.01–7, 19.01–19.07; D14/341–346
See application file for complete search history.

(56) References Cited

U.S. PATENT DOCUMENTS

| | | | | |
|---|---|---|---|---|
| 5,214,428 A | * | 5/1993 | Allen | .......................... 345/179 |
| 5,996,956 A | * | 12/1999 | Shawver | ...................... 345/179 |
| 6,819,557 B2 | * | 11/2004 | Lilenfeld | ..................... 345/179 |
| 7,061,762 B2 | * | 6/2006 | Canova et al. | ........... 178/19.01 |
| 7,221,360 B2 | * | 5/2007 | Defuans et al. | .............. 345/179 |
| 2001/0012000 A1 | * | 8/2001 | Eberhard | ...................... 345/173 |
| 2002/0183862 A1 | * | 12/2002 | Chen et al. | .................. 361/681 |
| 2004/0112143 A1 | * | 6/2004 | Richardson | ................... 73/856 |
| 2004/0160431 A1 | * | 8/2004 | DiMambro et al. | ......... 345/179 |
| 2006/0188861 A1 | * | 8/2006 | Wood et al. | ................. 434/322 |

\* cited by examiner

*Primary Examiner*—David L. Lewis
(74) *Attorney, Agent, or Firm*—Birch, Stewart, Kolasch & Birch, LLP

(57) ABSTRACT

An electronic device. The electronic device comprises a housing, an abutment and an indexing device. The housing comprises an engaging portion and an outer surface, and the abutment disposed on the housing comprises a clamping portion accessible through the housing via the engaging portion. The indexing device is detachably disposed on the exposed clamping portion.

20 Claims, 5 Drawing Sheets

ELECTRONIC DEVICE

BACKGROUND OF THE INVENTION

1. Field of the Invention

The present invention relates to an electronic device, and in particular to an electronic device providing a replaceable abutment to hold an indexing device.

2. Brief Discussion of the Related Art

Electronic products such as Personal Digital Assistants (PDAs) and gaming devices typically provide a touch panel controlled by a stylus. Conventionally, these electronic products provide a hole for receiving the stylus therein when idle, or a recess or several protrusions integrally formed on an outer surface of the host to hold the stylus thereon.

The stylus may become stuck, however, too deeply to be easily removed from the hole when the hole expands or the structure near the hole is deformed. Furthermore, as the recess or protrusions integrally formed on the housing of the host become worn, they may fail to hold the stylus, resulting the need to replace the entire housing of the host.

SUMMARY OF THE INVENTION

The electronic device of the invention comprises a housing, an abutment and an indexing device. The housing comprises an engaging portion and an outer surface. The abutment disposed on the housing comprises a clamping portion accessible through the housing via the engaging portion. The indexing device is detachably disposed on the exposed clamping portion of the abutment on the housing.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the subsequent detailed description and the accompanying drawings, which are given by way of illustration only, and thus are not limitative of the present invention, and wherein.

DETAILED DESCRIPTION OF THE INVENTION

Figure 1A:
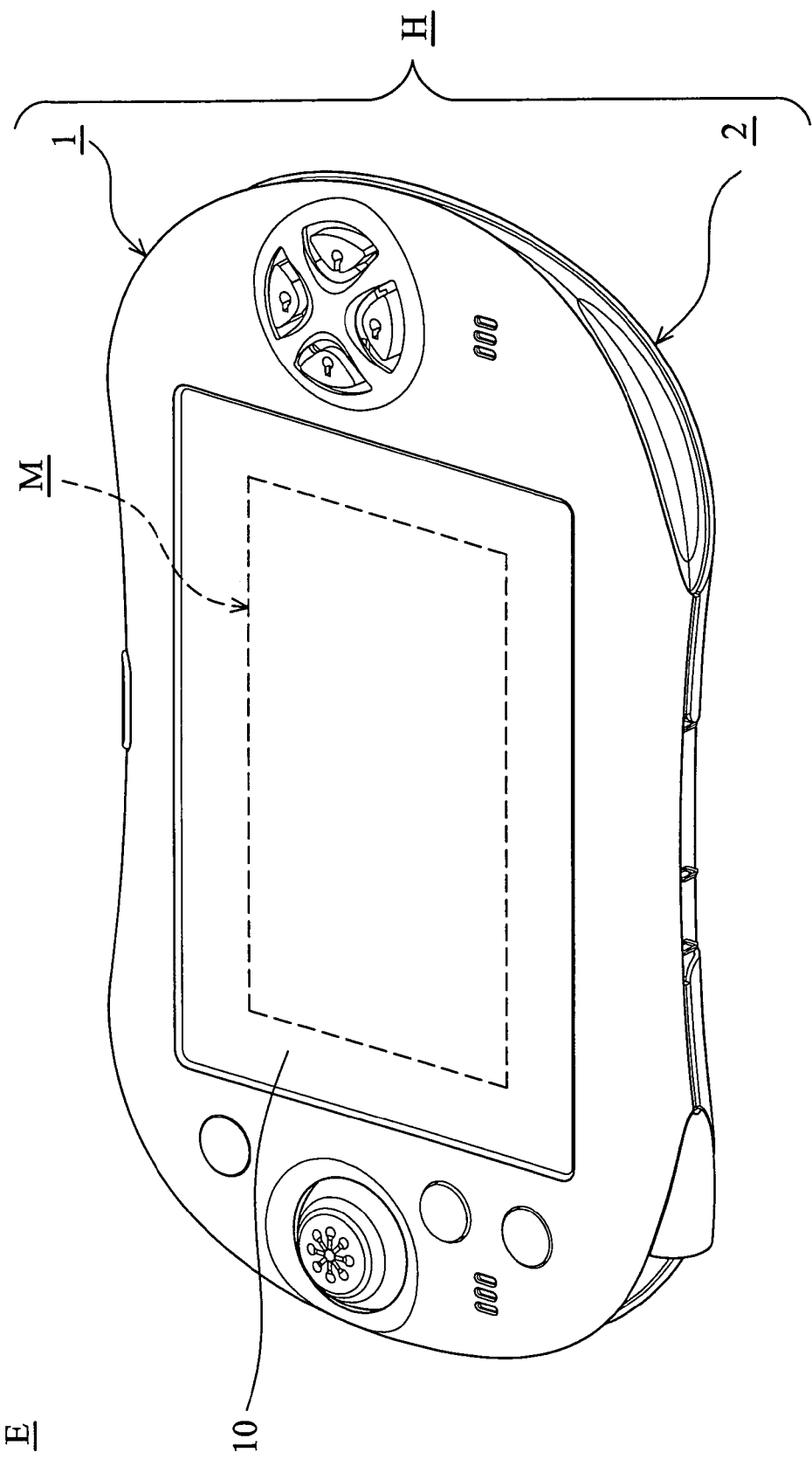
FIG. 1A is a perspective view of an electronic device (E) of an embodiment of the invention.
Figure 1B:
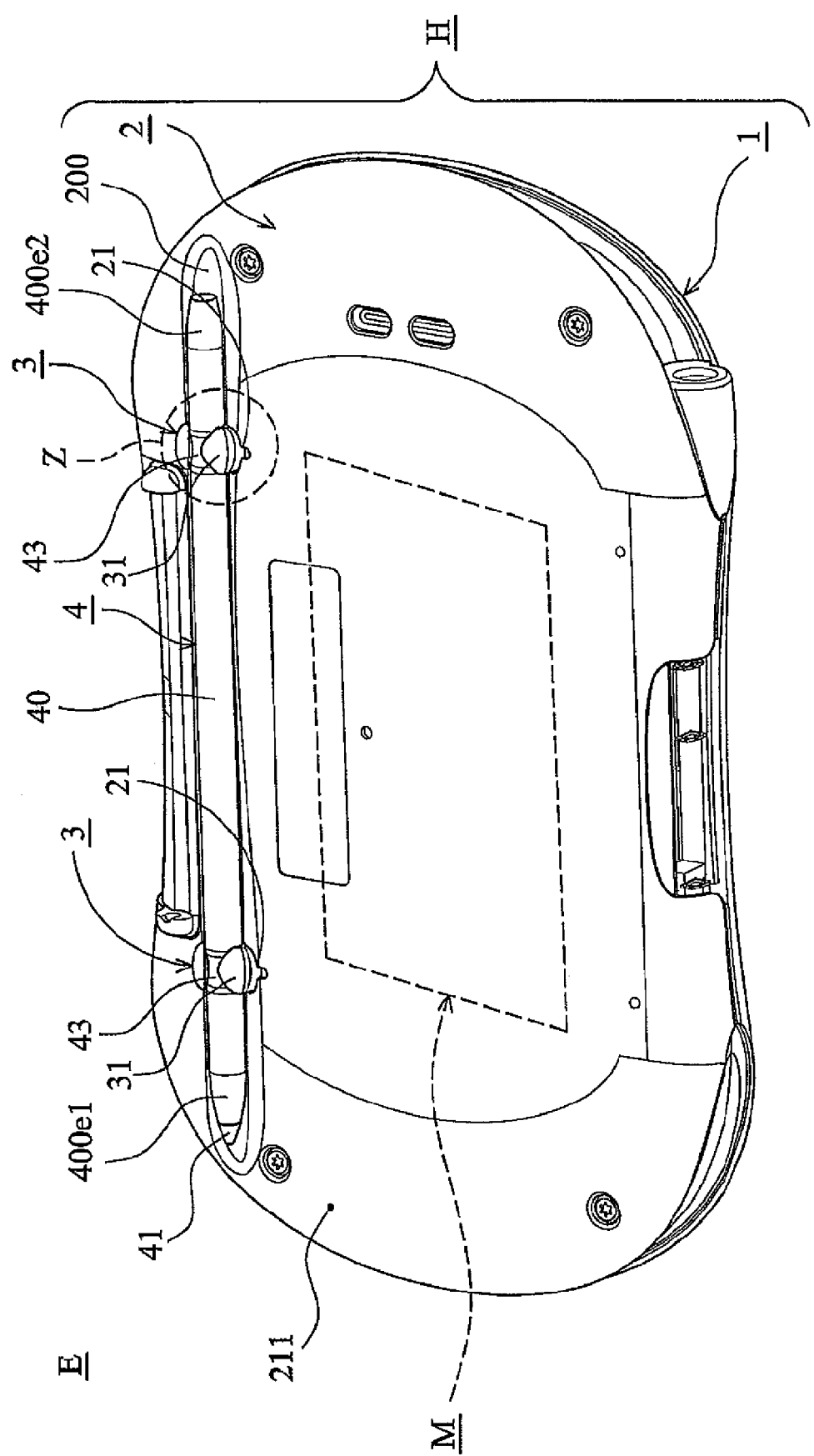
FIG. 1B is a rear perspective view of the electronic device (E) of FIG. 1A.
Figure 1C:
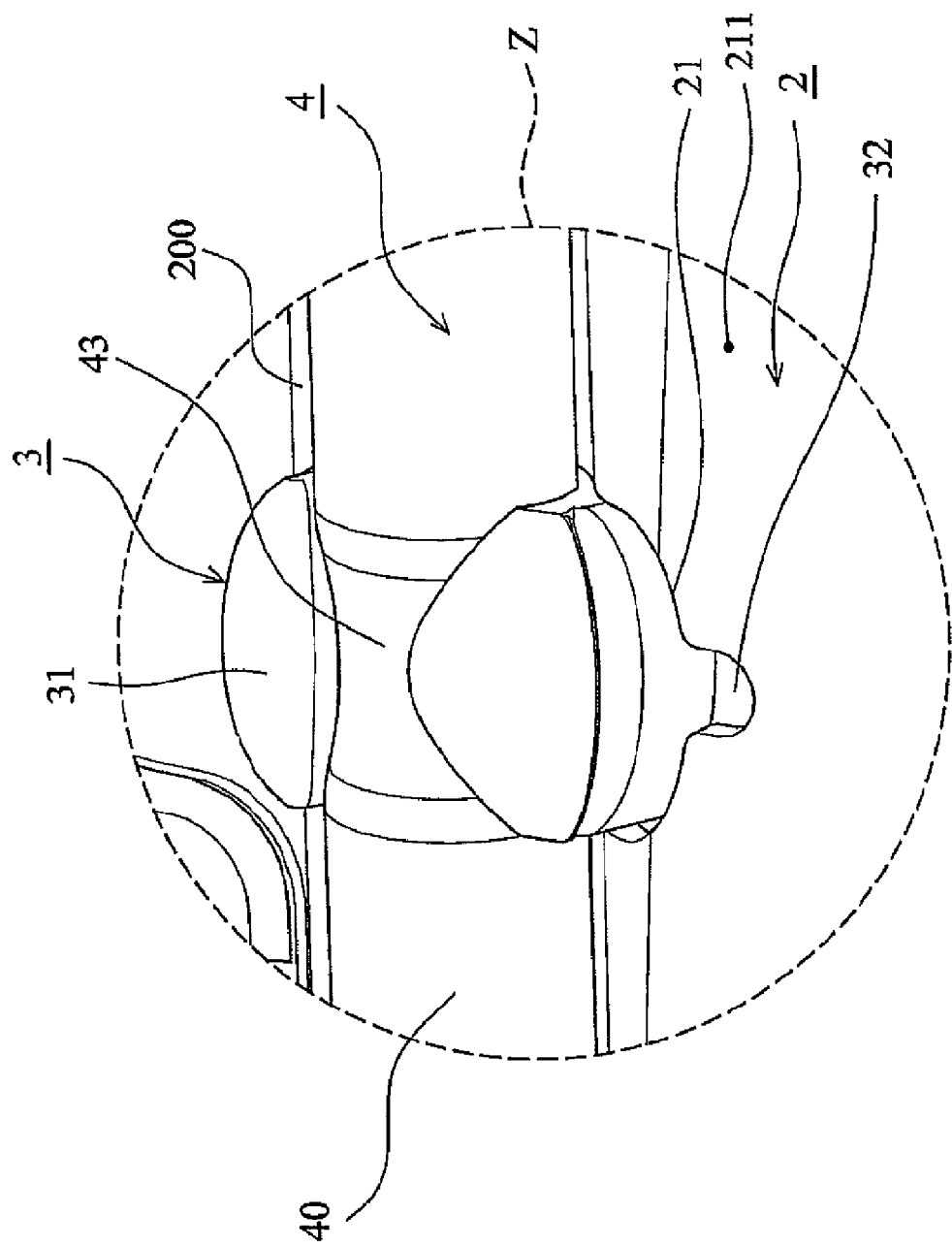
FIG. 1C is an enlarged perspective view of a region (Z) of the electronic device (E) of FIG. 1B.

FIGS. 1A and 1B are perspective views of an electronic device E of the invention, and FIG. 1C is an enlarged perspective view of a region Z in FIG. 1B. The electronic device E such as a gaming device or Personal Digital Assistant (PDA) comprises a housing H having a first body 1 and a second body 2, two abutments 3, an indexing device 4, a circuit board M and a touch panel 10. The indexing device 4 comprises a cylindrical body 40, two spaced annular recessions 43 formed outside the cylindrical body 40, two end portions 400e1 and 400e2 formed on the cylindrical body 40, and a tip 41 formed on the end portion 400e1 of the cylindrical body 40. The cylindrical body 40 is detachably disposed on the protruded clamping portions 31 of the fixed abutments 3. In this embodiment, the electronic device E is a gaming device, and the indexing device 4 is a stylus for controlling the touch panel 10. The circuit board M disposed in the housing H functions as a calculation unit. The touch panel 10 disposed on the first body 1 is electrically connected to the circuit board M.

In FIGS. 1B and 1C, the second body 2 is a rounded plate comprising two engaging portions 21, an outer surface 211, and a longitudinal recess 200 formed on the outer surface 211. The engaging portions 21 are openings formed on the outer surface 211 and penetrating the second body 2. The abutments 3 disposed on the second body 2 of the housing H are exposed by the outer surface 211 via the engaging portions 21, i.e., the abutments 3 positioned in the engaging portions 21 protrude from the outer surface 211 to secure the indexing device 4 thereon.

By positioning the annular recessions 43 of the indexing device 4 at the clamping portions 31 of the abutments 3, the cylindrical body 40 of the indexing device 4 is clamped by the protruded clamping portions 31 of the fixed abutments 3. The clamped indexing device 4 is partially received in the longitudinal recess 200, and the tip 41 of the indexing device 4 is exposed on the outer surface 211 of the second body 2 does not contact the protruded clamping portions 31 of the fixed abutments 3.

Figure 2A:
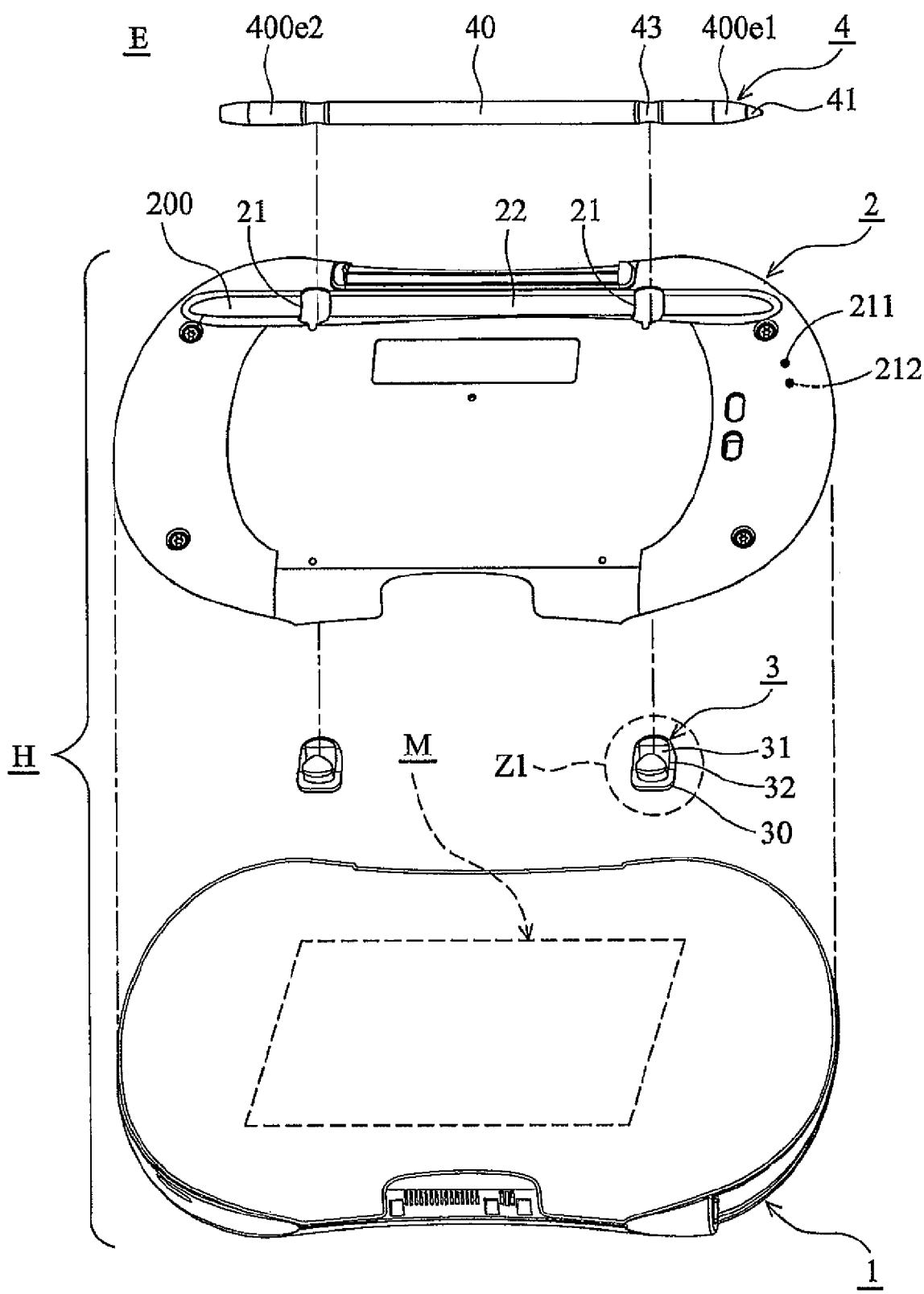
FIG. 2A is an exploded perspective view of the electronic device (E) of FIG. 1B.
Figure 2B:
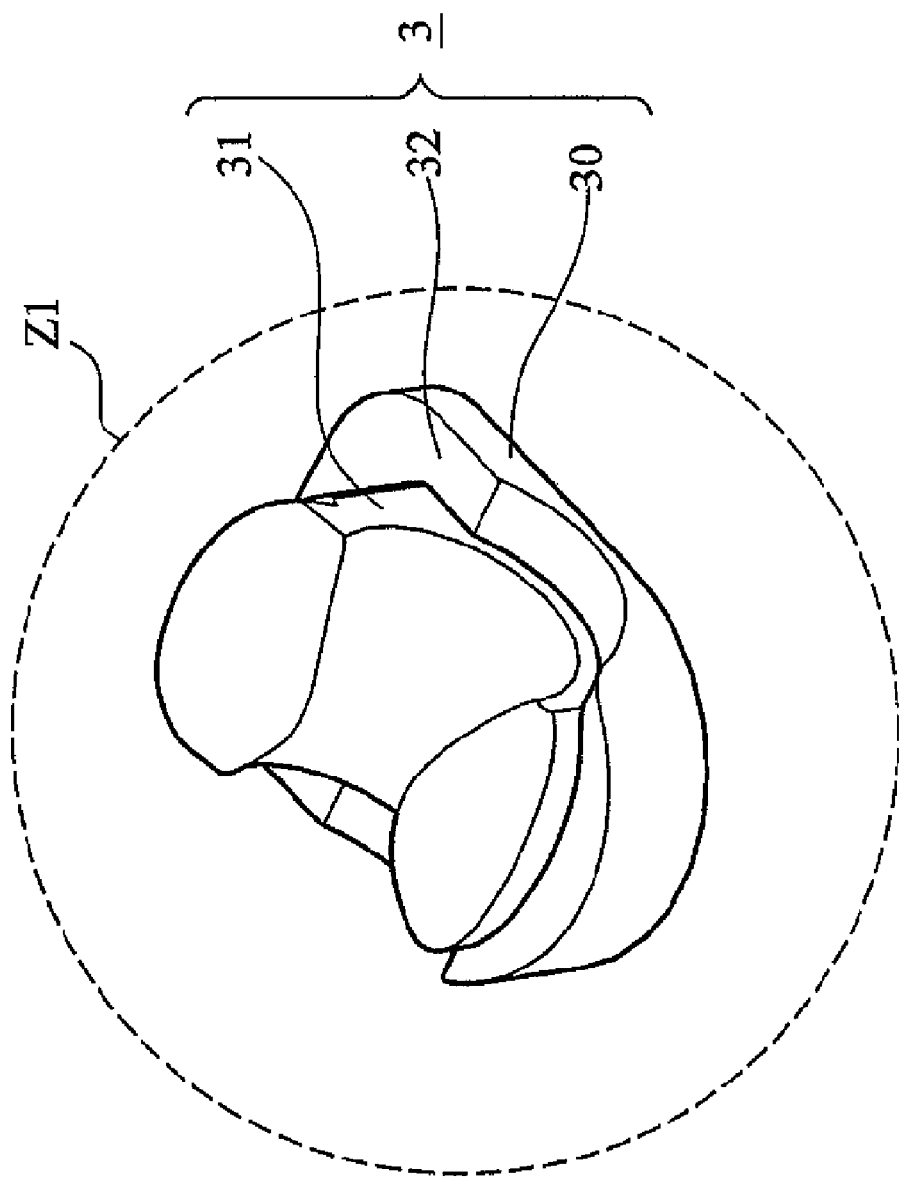
FIG. 2B is an enlarged perspective view of a region (Z1) of the electronic device (E) of FIG. 2A.

FIG. 2A is an exploded perspective view of the electronic device E of FIG. 1B, and FIG. 2B is an enlarged perspective view of a region Z1 of the electronic device E of FIG. 2A.

In FIG. 2A, the second body 2 further comprising an inner surface 212, and a longitudinal recess 22 is formed on the outer surface 211 intersecting the engaging portions 21.

In FIG. 2B, the abutment 3 comprises a base portion 30 and a clamping portion 31. The clamping portion 31 comprising a C-shaped structure is connected to the base portion 30 and a shoulder 32 is formed therebetween. In this embodiment, the base portion 30 and the clamping portion 31 are integrally formed and comprising rubber.

Referring to FIGS. 2A and 1B, as the abutment 3 fitted in the engaging portion 21 and clamped by the assembled first body 1 and the second body 2, the clamping portion 31 fitted in the engaging portion 21 is exposed by the outer surface 211 of the second body 2, and the shoulder 32 of the abutment 3 is pressed against the inner surface 212. The indexing device 4 is then detachably disposed on the clamping portions 31 of the abutments 3 and received in the recess 22 of the second body 2, i.e., the indexing device 4 is detachably received on the outside of the housing H.

Thus, the indexing device 4 can be easily positioned on the clamping portions 31 of the abutments 3, and the indexing device 4 is substantially hidden below the outer surface 211 of the housing H. Additionally, the abutments 3 are easily replaced when worn or fail to hold the indexing device 4 any longer.

While the invention has been described in connection with what is presently considered to be the most practical and preferred embodiment, it is to be understood that the invention is not limited to the disclosed embodiments, but, on the contrary, is intended to accommodate various modifications and equivalent arrangements included within the spirit and scope of the appended claims.

What is claimed is:

1. An electronic device, comprising:
   a first body;
   a second body disposed on the first body, having at least one engaging portion;
   an abutment disposed between the first body and the second body, having a clamping portion fitted in the engaging portion of the second body; and
   an indexing device having a cylindrical body detachably disposed on the clamping portion of the abutment and two end portions formed on the cylindrical body, wherein the clamping portion of the abutment is located between the end portions of the indexing device when the cylindrical body of the indexing device is clamped by the clamping portion of the abutment.

2. The electronic device as claimed in claim 1, wherein the second body has an outer surface, and the engaging portion has an opening formed on the outer surface to expose the clamping portion thereon.

3. The electronic device as claimed in claim 1, wherein the abutment has a base portion connected to the clamping portion, and the base portion is disposed between the first body and the second body.

4. The electronic device as claimed in claim 1, wherein the indexing device is a rod-like element.

5. The electronic device as claimed in claim 1, wherein the indexing device is a stylus.

6. The electronic device as claimed in claim 1, wherein the abutment is rubber.

7. The electronic device as claimed in claim 1, wherein the electronic device is a gaming device.

8. An electronic device, comprising:
   a housing (H) having an outer surface and an engaging portion disposed on the outer surface;
   an abutment disposed on the housing (H), having a clamping portion accessible through the housing (H) via the engaging portion; and
   an indexing device having a cylindrical body detachably disposed on the clamping portion of the abutment and two end portions formed on the cylindrical body, wherein the clamping portion of the abutment is located between the end portions of the indexing device when the cylindrical body of the indexing device is clamped by the clamping portion of the abutment.

9. The electronic device as claimed in claim 8, wherein the engaging portion has an opening formed on the outer surface.

10. The electronic device as claimed in claim 8, wherein the abutment has a base portion connected to the clamping portion and disposed on the housing (H).

11. The electronic device as claimed in claim 8, wherein the indexing device is a rod-like element.

12. The electronic device as claimed in claim 8, wherein the indexing device is a stylus.

13. The electronic device as claimed in claim 8, wherein the abutment is rubber.

14. The electronic device as claimed in claim 8, wherein the electronic device is a gaming device.

15. The electronic device as claimed in claim 10, wherein the base portion and the clamping portion are integrally formed.

16. The electronic device as claimed in claim 1, wherein the indexing device has two annular recessions formed outside the cylindrical body, thereby positioning the clamping portion of the abutments thereon when the cylindrical body of the indexing device is clamped by the clamping portions of the abutments.

17. An electronic device, comprising:
   a first body;
   a second body disposed on the first body, having an outer surface and at least one engaging portion formed on the outer surface;
   a plurality of fixed abutments disposed between the first body and the second body, each of which has a clamping portion fitted in the engaging portion and protruded from the outer surface of the second body; and
   an indexing device having a cylindrical body detachably disposed on the protruded clamping portions of the fixed abutments and a tip formed on the cylindrical body, wherein when the cylindrical body of the indexing device is clamped by the protruded clamping portions of the fixed abutments, the tip of the indexing device exposed on the outer surface of the second body does not contact the protruded clamping portions of the fixed abutments.

18. The electronic device as claimed in claim 17, wherein the indexing device has two annular recessions formed outside the cylindrical body, thereby positioning the protruded clamping portion of the fixed abutments thereon when the cylindrical body of the indexing device is clamped by the protruded clamping portions of the fixed abutments.

19. The electronic device as claimed as claim 17, wherein the second body has a longitudinal recess formed on the outer surface thereof to partially receive the indexing device.

20. The electronic device as claimed in claim 19, wherein the longitudinal recess is connected to the engaging portion.

* * * * *